(12) United States Patent
Handley

(10) Patent No.: US 7,568,656 B2
(45) Date of Patent: Aug. 4, 2009

(54) SYSTEM FOR CONTROLLING THE LIFT OF AIRCRAFT

(76) Inventor: Alan R. Handley, 1 Laburnum Street, Wollaston, Stourbridge (GB) DY8 4NX ( * ) Notice: Subject to any disclaimer, the term of this patent is extended or adjusted under 35 U.S.C. 154(b) by 470 days.

(21) Appl. No.: 11/115,554

(22) Filed: Apr. 26, 2005

(65) Prior Publication Data

US 2005/0236519 A1 Oct. 27, 2005

(30) Foreign Application Priority Data

| Apr. 27, 2004 | (GB) | ................................. 0409314.2 |
| Jun. 2, 2004 | (GB) | ................................. 0412220.6 |
| Jun. 16, 2004 | (GB) | ................................. 0413437.5 |

(51) Int. Cl.
*B64B 1/02* (2006.01)
(52) U.S. Cl. .............................. 244/24; 244/30; 244/97; 244/98; 244/99
(58) Field of Classification Search .................. 244/30, 244/97, 98, 99, 24
See application file for complete search history.

(56) References Cited

U.S. PATENT DOCUMENTS

| 3,620,485 | A | * | 11/1971 | Gelhard et al. ................. 244/29 |
| 5,368,067 | A | | 11/1994 | Cook, Jr. | |
| 5,538,203 | A | * | 7/1996 | Mellady ........................ 244/97 |
| 6,131,851 | A | * | 10/2000 | Williams ....................... 244/58 |
| 6,648,272 | B1 | * | 11/2003 | Kothmann .................... 244/97 |
| 7,275,569 | B2 | * | 10/2007 | Hobbs ........................... 141/97 |
| 2002/0179771 | A1 | * | 12/2002 | Senepart ...................... 244/97 |

FOREIGN PATENT DOCUMENTS

| DE | 4112621 A1 | 10/1992 |
| DE | 4233768 A1 | 10/1993 |
| FR | 768327 | 8/1937 |
| FR | 1601319 | 8/1970 |
| GB | 2196919 A | 5/1988 |
| WO | 2005/019025 A1 | 3/2005 |
| WO | 2005/081680 A2 | 9/2005 |

* cited by examiner

*Primary Examiner*—J. Woodrow Eldred
(74) *Attorney, Agent, or Firm*—Fulbright & Jaworski LLP

(57) ABSTRACT

A system for controlling lift of an aircraft comprises an inflatable compartment for containing a gas which is lighter than air. A receiver receives and stores the gas in a compressed condition. Means are provided for compressing the gas and transferring it from the inflatable compartment into the receiver thus reducing the lift force on the aircraft.

21 Claims, 3 Drawing Sheets

SYSTEM FOR CONTROLLING THE LIFT OF AIRCRAFT

Figure 1:
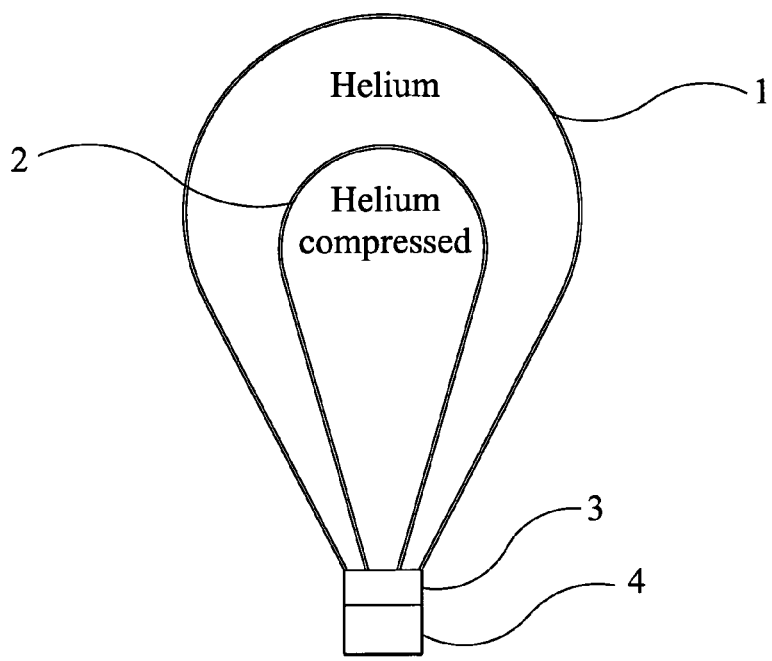

The present invention relates to a system for controlling the lift of an aircraft. More particularly it relates to a system for a controlling lift in an airship or balloon using a lighter-than air gas.

Airships have the potential to carry large quantities of goods, or passengers. This potential is best realized in a rigid-body airship, as opposed to the flexible body airship or blimp, because of the structural demands placed on the materials used.

Airships have a problem in landing and load-carrying due to having a fixed displacement of air by lighter than air gas. Due to the usage of fuel during a flight the airship gets lighter and because it has a fixed displacement the airship has to be powered down to earth by the use of the engines. It then involves many ground crew to stabilize and secure it. Similarly, for balloons (for example hot-air balloons and Helium balloons) variables, such as air temperature, make the landing very difficult to control.

It is an object of the present invention to provide a system that alleviates these problems. A further object is to provide a controlled take off, flight, and landing for airships from ground level or other base without disposing of ballast. This would give airships the ability to load and unload whilst on the ground or base station. Yet another object is to provide a compressor for use in such a system.

According to a first aspect of the present invention there is provided a system for controlling lift of an aircraft, comprising: an inflatable compartment for containing a gas which is lighter than air; a receiver for receiving and storing the gas in a compressed condition; and means for compressing the gas and transferring it from the inflatable compartment into the receiver thus reducing the lift force on the aircraft.

The system preferably further comprises means for expanding the gas and transferring it from the receiver into the inflatable compartment thus increasing the lift. A valve means may be provided for controlling the transfer of the gas between the receiver and the inflatable compartment. Preferably, the receiver is directly coupled to the inflatable compartment via the valve means and the means for compressing the gas, thereby providing a closed system.

In one embodiment, the aircraft is a balloon. The receiver may be a fixed dimension receptacle. Alternatively, the receiver may be an inflatable receptacle, the inflatable compartment being manufactured from a material that is more easily inflatable than the receiver.

In another embodiment, the aircraft is a rigid-body airship. The airship may comprise a metal shell, preferably of Aluminium. A variable displacement compartment, containing air, may surround the inflatable compartment. An opening may be provided in the rigid aircraft for air to pass into and out of the variable displacement compartment when the inflatable compartment is inflated and deflated.

The system may employ a plurality of inflatable compartments and variable displacement compartments, each inflatable compartment being housed within a respective variable displacement compartment.

The system may further comprise a fixed displacement compartment containing a gas, which is lighter than air. This compartment provides a fixed lift to overcome the dead weight of the airship, with the variable displacement compartments being used to vary the lift.

The gas is preferably an inert gas, more preferably Helium.

The system of the invention is one in which the amount of lift is controlled by varying the amount of Air displaced by Helium (or other lighter than air gas). This is made possible by, but not exclusively, the use of at least part of the airship having compartments that have fixed displacement and others that have variable displacements.

According to a second aspect of the present invention there is provided an aircraft lift control diaphragm compressor, comprising: first and second chambers having a common wall that comprises a diaphragm; means for compressing a first gas in said first chamber so as to displace said diaphragm towards said second chamber and compress a second, lighter than air, gas therein; and valve means for controlling charging of said second chamber with said second gas and discharging of said compressed second gas from said second chamber.

Due to the size of the helium molecule being far smaller than the constituents of air, it is difficult to compress with standard piston compressors and so this aspect of the invention concerns the application of the diaphragm pump or compressor for use in airships and balloons. The diaphragm pump or compressor has the advantage that the unit is hermetically sealed from the outside environment and therefore cannot let contaminants in or the helium out to atmosphere once fitted into a closed loop system.

The means for compressing the first gas in the first chamber may comprise a positive displacement compressor, which may be a piston having a reciprocating motion, whereby the first gas in the first chamber is decompressed by a return stroke of said piston, such that the second chamber is charged and discharged as a result of movement of said diaphragm towards and away from said second chamber during alternating strokes of said piston in opposing directions.

In a preferred embodiment, the diaphragm is constructed of metal. This is advantageous because Helium will not permeate through the metal as it would through, say, a polymer material.

According to a third aspect of the present invention there is provided a rigid body airship comprising: a shell for containing a lighter than air gas; at least one variable displacement compartment within said shell, the variable displacement compartment having an associated inflatable container therein; a receiver for receiving and storing said gas in a compressed condition; means for compressing the gas and transferring it from the inflatable container into the receiver so as to reduce the lift force on the aircraft; means for expanding the gas and transferring it from the receiver into the inflatable container so as to increase the lift; and at least one opening in said shell for allowing air to pass into and out of the variable displacement compartment.

Figure 2:
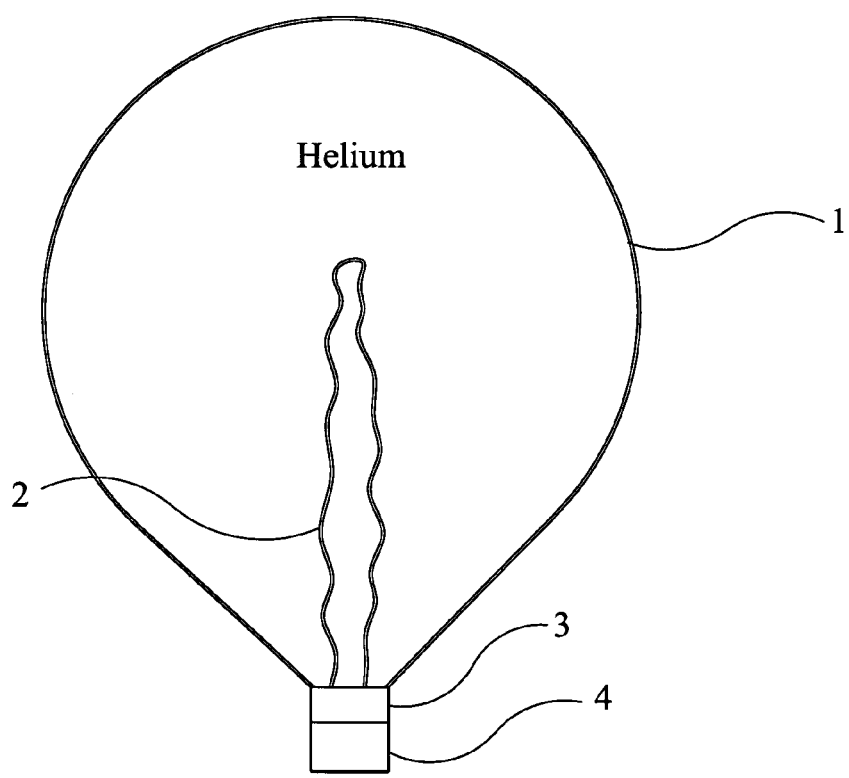
Figure 3:
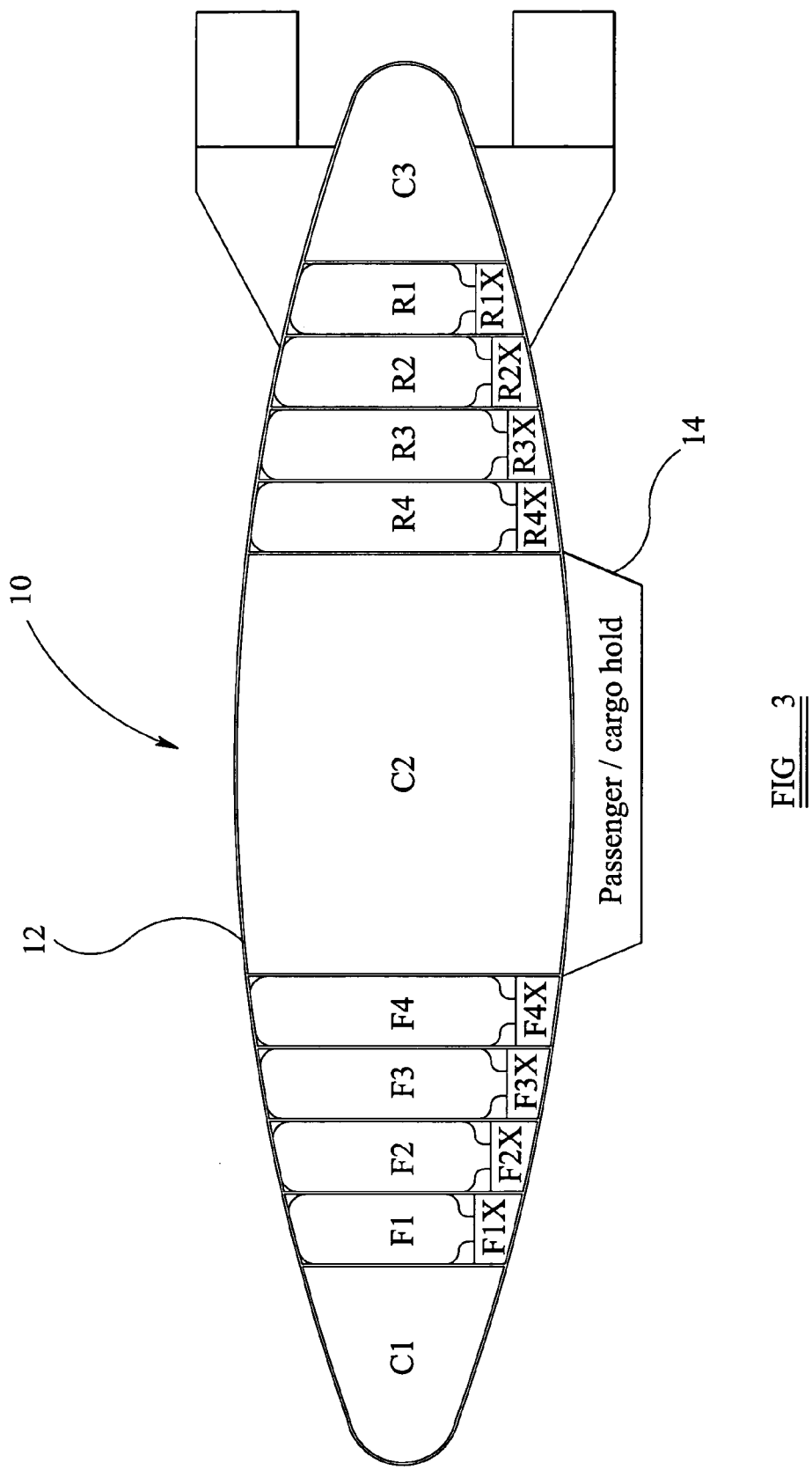
Figure 4:
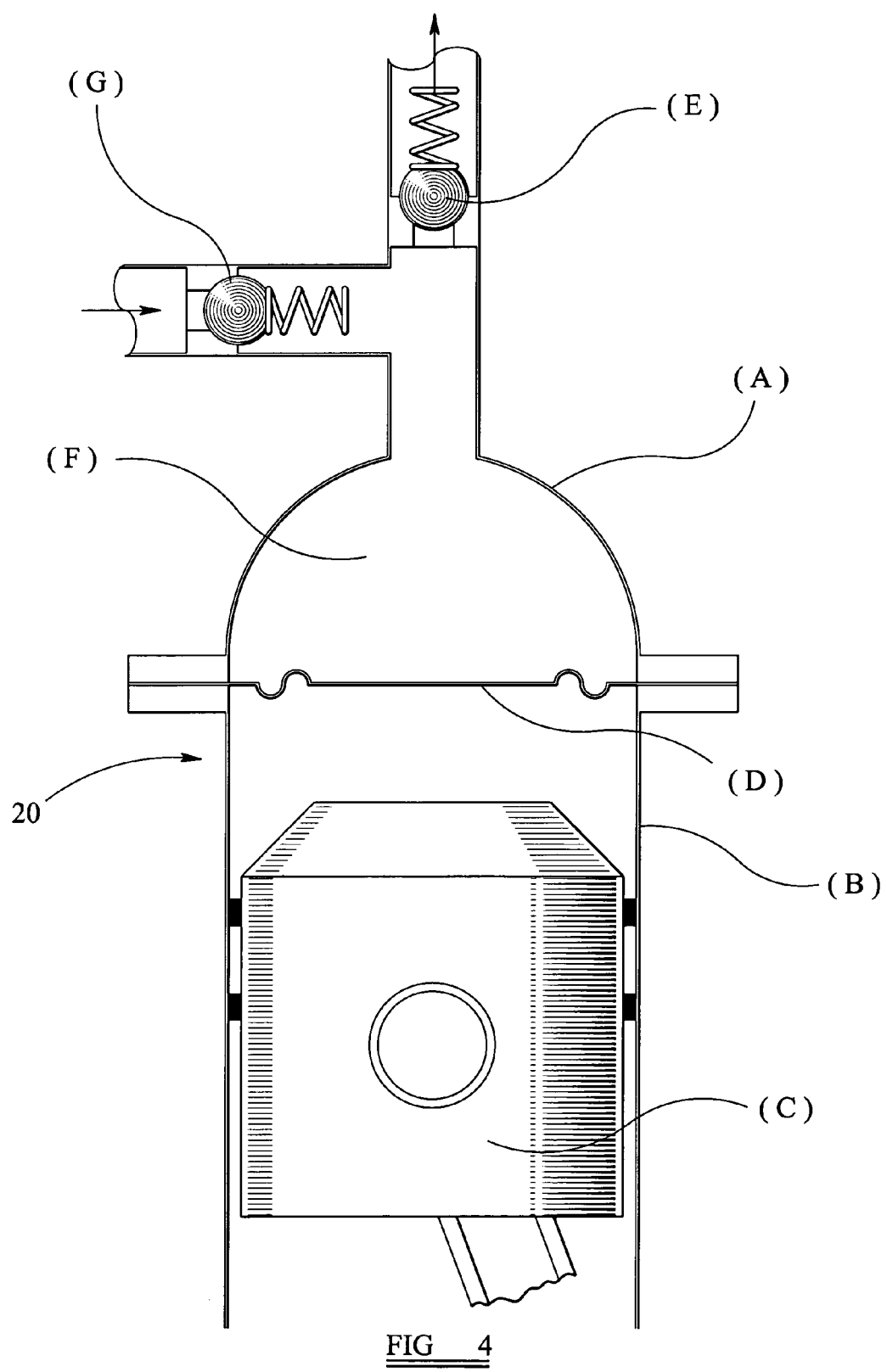

Embodiments of the present invention will now be described with reference to the accompanying drawings, in which:

FIGS. 1 and 2 show two conditions of a helium balloon;
FIG. 3 is a sectional elevation of an airship; and
FIG. 4 is a sectional elevation of a diaphragm pump.

Referring to FIGS. 1 and 2, a Helium balloon has an outer balloon envelope 1 and an inflatable receiver 2. A valve station 3 and a compressor 4 are suspended underneath the balloon envelope 1. By the use of the compressor 4, the lift gas can be transferred from the balloon envelope 1 into the receiver 2. The receiver 2 could be an inflatable inner balloon (as shown in FIGS. 1 and 2) that requires pressure to inflate, or a fixed dimension receptacle (not shown).

One arrangement is to have the outer balloon envelope 1 manufactured from a suitable material that needs very little pressure to inflate it, with the receiver 2 as a second balloon either inside or outside the balloon envelope 1, but for this illustration will be described as inside. The receiver balloon 2 would be smaller and manufactured from a material that would stretch upon inflation and would require pressure to inflate it so as to reduce the volume of the inflating gas. The receiver balloon 2 would be directly coupled to the outer balloon 1 via the valve station 3 and compressor 4 so as to complete a closed loop system.

For pressure regulation, for example in response to the heating of the outer balloon 1 contents by the sun or air temperature, this can be controlled by the transfer of the lift gas from the outer envelope 1 to the inner balloon 2 or vice versa by the compressor 4 and valves 3.

The compressor 4 could be driven directly, either by an engine, or an electric motor powered from an engine driven electric generator or battery or both The control of the transfer of the lift gas could be manual or by programmable controller via a key-pad or other system.

The condition of the balloon shown in FIG. 1 provides a reduced lift. Part of the lift gas has been transferred from the balloon envelope 1 into the receiver 2 and is held under pressure reducing the displaced volume of the balloon envelope 1. The condition shown in FIG. 2 provides maximum lift. The lift gas has been transferred from the receiver 2 into the balloon envelope 1. On transfer the compression is removed and the gas expands to give the balloon envelope 1 a much larger displacement and therefore more lift.

By control of the amount of transfer the lift may be varied to suit the requirements of the operator. This principle of the invention could be used as a single unit in a balloon (as shown in FIGS. 1 and 2) or as multiple units in compartments of a multi compartment air ship (as will be described in more detail below).

Referring to FIG. 3, a rigid body airship 10, has a metal body shell 12 formed of aluminium or lightweight alloy. A load-bearing hold 14 is suspended underneath the body shell 12.

C1, C2, C3 are fixed displacement compartments containing a lighter-than-air gas such as Helium, giving a combined lift just under the total weight of the airship 10. R1, R2, R3, R4 are rear variable displacement compartments. Inside each of the variable displacement compartments R1, R2, R3 and R4 is an inflatable. R1X, R2X, R3X, R4X are rear receivers with associated compressors. F1, F2, F3, F4 are front variable displacement compartments, each with an inflatables, and F1X, F2X, F3X, F4X are the receivers with associated compressors.

Each of the variable displacement compartments R1, R2, R3, R4, F1, F2, F3, F4 is provided with a vent opening (not shown) through the shell 12 to allow air displaced from compartment to escape to the surroundings when the inflatable is inflated, and to allow air from the surroundings to enter the compartment when the inflatable is deflated. The vent openings are preferably sited on the underside of the shell 12 because any Helium escaping from an inflatable, being lighter than air, will rise towards the top of the compartment.

The fixed displacements C1 and C3 are provided to give sufficient lift to support the structure at each end of the airship 10 to prevent cantilever loads to the structure when the lift in the variable compartment is reduced or removed.

Helium gives a lift of 1 kilogram per cubic meter. Therefore, by mathematical calculation of the volume of compartments C1, C2, C3 with regard to the overall weight of the airship, a suitable ship can be constructed. Compartments F1, F2, F3, F4 and R1, R2, R3, R4 give final lift to include passengers and cargo.

In the arrangement shown in FIG. 3, the fixed compartments C1, C2, C3 would have a lift force of an amount slightly lower than the weight of the airship 10, thus keeping the airship 10 firmly on the ground when being loaded or out of use. The variable compartments F1, F2, F3, F4, R1, R2, R3, R4 would have compressed Helium (or other inert lighter than air gas) stored in the receivers F1X, F2X, F3X, F4X, R1X, R2X, R3X, R4X. Each variable compartment F1, F2, F3, F4, R1, R2, R3, R4 has an inflatable fitted inside. Through the use of suitable valves the Helium (or other lighter than air gas) would, in a controlled way, be transferred from a receiver (for example R1X) to the associated inflatable. As inflation takes place this would displace the air in that variable displacement compartment (R1) and add to the lifting force. By controlling which variable compartment was inflated or the amount of the inflation taking place then the airship would rise in the air to a height required by the controller.

Selecting the forward F1, F2, F3, F4 or rear R1, R2, R3, R4 variable compartments for inflating would set the pitch of the airship 10, as required. Adjustment of the amount of inflation of selected compartments may be used to set the trim for the airship 10 in flight. The trim could also be maintained by transfer of Helium (or other inert lighter than air gas) from one variable compartment to another by way of the compressors and valves.

In order to land the airship 10, the Helium in the variable compartments F1, F2, F3, F4, R1, R2, R3, R4 would be re-compressed into the receivers F1X, F2X, F3X, F4X, R1X, R2X, R3X, R4X by the compressors, deflating the inflatables and reducing the displacement of the air, thereby reducing lift. By carefully controlling the flow of Helium (or other inert lighter than air gas) from inflatables to receivers F1X, F2X, F3X, F4X, R1X, R2X, R3X, R4X a smooth descent to the landing area would be achieved.

In this way the Helium (or other inert lighter than air) gas is reused and is encapsulated in a closed loop system.

The stored Helium (or other lighter than air gas) in the receivers F1X, F2X, F3X, F4X, R1X, R2X, R3X, R4X could also be used to top up the fixed displacement compartments C1, C2, C3 as and if required.

It should be noted that in flight most of the compressed receivers would be at a very low or zero pressure.

It is within the scope of the invention to have all compartments with variable displacement, but this would depend on the practicalities of construction.

FIG. 3 shows one arrangement of both fixed and variable compartments but these could be changed by position or quantity to suit particular design requirements.

The transfer valves and compressors could be controlled by hand or an onboard Computer or Programmable Logic Controller or by other devices.

In order for the system described above to operate effectively, a suitable compressor is required to compress the lighter-than-air gas from the variable displacement compartment into the receiver. Because the helium molecule is far smaller than that of the constituents of air, it is difficult to compress with standard piston compressors and so this aspect of the invention concerns the application of the diaphragm pump or compressor for use in airships and balloons. The diaphragm pump or compressor has the advantage that the unit is hermetically sealed from the outside environment and therefore cannot let contaminants in or the helium out to atmosphere once fitted into a closed loop system.

One such diaphragm unit will now be described as an add-on module to a standard piston compressor. With reference to FIG. 4, a module A is fitted in place of the cylinder head on a piston compressor 20, having a cylinder B inside which a piston C reciprocates. A diaphragm D forms part of a wall separating a chamber F in the module A, from the cylinder B. When the piston C moves up, the air in the cylinder B compresses and deflects the diaphragm D, causing the helium in the chamber F to be compressed. The helium is then forced through a non-return valve E. On the down stroke of the piston C, the air compression is removed and the diaphragm D returns to its normal position so that helium is forced into the chamber F through another non-return valve G by the outside pressure. It will be appreciated that this return stroke may set up a negative pressure in the chamber F so as to suck helium in through the non-return valve G.

The diaphragm D itself is preferably formed of a thin metal. This is preferable to other flexible materials, such as polymers, because metals are much less permeable to helium.

It is within the scope of the application that the diaphragm pump or compressor can be operated by any of various means such as hydraulics or pneumatics by hand lever or electric motor or engine driven units.

The invention claimed is:

1. A system for controlling a lift force of an aircraft, comprising:
    a plurality of inflatable containers, each for containing a gas which is lighter than air;
    a plurality of variable displacement compartments containing air, each of said inflatable containers being housed within a respective variable displacement compartment;
    a plurality of receivers each associated with a respective inflatable container, each receiver for receiving and storing the gas in a compressed condition; and
    a plurality of compression systems, each associated with a respective inflatable container and a respective receiver, to compress and transfer the gas from the associated inflatable container into the associated receiver thus reducing the lift force on the aircraft, wherein each of the compression systems comprises a diaphragm compressor.

2. The system according to claim 1, further comprising openings in said aircraft for air to pass into and out of each variable displacement compartment when said associated inflatable container is inflated and deflated.

3. The system according to claim 1, wherein said variable displacement compartments are disposed at positions along a length of said aircraft, and the compression devices are provided for adjustment of an amount of inflation of selected inflatable containers to set the pitch and/or trim of the aircraft.

4. The system according to claim 3, wherein said variable displacement compartments comprise forward and rear variable compartments disposed at positions along the length of the aircraft.

5. The system according to claim 1 further comprising a plurality of expansion systems to expand and transfer the gas from one of the receivers into the associated inflatable container thus increasing the lift.

6. The system according to claim 5, further comprising a valve operable for controlling the transfer of the gas between each receiver and the associated inflatable container.

7. The system according to claim 1, wherein the aircraft comprises an airship.

8. The system according to claim 7, wherein the aircraft comprises a rigid-body airship.

9. The system according to claim 1, wherein the gas comprises an inert gas.

10. The system according to claim 9, wherein the inert gas comprises Helium.

11. A system for controlling a lift force on an aircraft, comprising:
    at least one fixed displacement compartment for containing a gas which is lighter than air;
    at least one inflatable container for containing the gas which is lighter than air;
    at least one receiver for receiving and storing the gas in a compressed condition; and
    a compression system that compresses and transfers the gas from the inflatable container into the receiver reducing the lift force on the aircraft.

12. The system of claim 11, wherein said fixed displacement compartment contains the gas which is lighter than air in an amount sufficient to provide a combined lift force to overcome a total weight of the aircraft.

13. The system of claim 11, further comprising a variable displacement compartment, wherein said inflatable container is housed within said variable displacement compartment.

14. A system according to claim 11 further comprising an expansion system that expands and transfers the gas from the receiver into the inflatable container increasing the lift force on the aircraft.

15. The system of claim 14, wherein said expansion system is further operable for transferring gas from the receiver into the fixed displacement compartment.

16. The system according to claim 11, wherein said compression system is operable for adjusting an amount of inflation of said containers to set a pitch and/or trim of the aircraft.

17. The system according to claim 16, further comprising a valve operable for controlling the transfer of the gas between each receiver and the associated inflatable container.

18. The system according to claim 11, wherein the aircraft comprises an airship.

19. The system according to claim 18, wherein the aircraft comprises a rigid-body airship.

20. The system according to claim 11, wherein the gas comprises an inert gas.

21. The system according to claim 20, wherein the inert gas comprises Helium.

* * * * *